US012682399B2

(12) United States Patent
Jaycobs

(10) Patent No.: US 12,682,399 B2
(45) Date of Patent: ***Jul. 14, 2026

(54) INTERFACE FOR LANDFALL LOCATION OPTIONS

(71) Applicant: CFPH, LLC, New York, NY (US)

(72) Inventor: Rich Jaycobs, Burlington, MA (US)

(73) Assignee: CFPH, LLC, New York, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 19/019,764

(22) Filed: Jan. 14, 2025

(65) Prior Publication Data

US 2025/0156950 A1 May 15, 2025

Related U.S. Application Data

(63) Continuation of application No. 18/368,608, filed on Sep. 15, 2023, now Pat. No. 12,254,514, which is a continuation of application No. 17/515,643, filed on Nov. 1, 2021, now Pat. No. 11,798,084, which is a continuation of application No. 15/616,575, filed on Jun. 7, 2017, now Pat. No. 11,164,249.

(60) Provisional application No. 62/347,749, filed on Jun. 9, 2016.

(51) Int. Cl.
*G06Q 20/40* (2012.01)
*G06Q 40/04* (2012.01)
*G06T 11/26* (2026.01)
*G06F 3/0481* (2022.01)
*H04L 9/40* (2022.01)

(52) U.S. Cl.
CPC .............. *G06Q 40/04* (2013.01); *G06T 11/26* (2026.01); *G06F 3/0481* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 7,181,346 B1 * | 2/2007 | Kleist | .................. | G01W 1/10 |
| | | | | 702/3 |
| 2008/0133429 A1 * | 6/2008 | Horowitz | .............. | G06Q 40/00 |
| | | | | 715/753 |

* cited by examiner

*Primary Examiner* — Bennett M Sigmond
*Assistant Examiner* — Bhavin D Shah

(57) ABSTRACT

An apparatus, method, and non-transitory medium for betting on weather predictions are disclosed herein. A plurality of longitude and latitude coordinate pairs may be received from a remote device. The display device may render data representing a binary option based on whether a storm will make landfall within the certain radius. A request to purchase the binary option may be received. It may be determined whether the landfall location corresponds to a zip code associated with the given longitude latitude pair in the memory.

18 Claims, 8 Drawing Sheets

202 RECEIVING LOCATION INFORMATION FOR A REGION

204 POPULATING A DATABASE WITH MAPPINGS BETWEEN LATITUDE AND LONGITUDE COORDINATES AND ZIP CODES USING THE RECEIVED INFORMATION

206 LISTING FOR TRADING HURRICANE LANDFALL BINARY OPTIONS FOR EACH MAPPED ZIP CODE

208 PROVIDING INFORMATION TO TRADING INTERFACES TO FACILITATE TRADING BY BUYERS AND/OR SELLERS

210 MATCHING ORDERS FOR SALE AND PURCHASE OF THE LISTED HURRICANE LANDFALL BINARY OPTIONS

212 MAINTAINING MARGIN LIMITS ON SELLERS OF OPTIONS

214 INCLUDE RECEIVING A LATITUDE AND LONGITUDE OF A HURRICANE LANDFALL

216 DETERMINING AFFECTED ZIP CODES FOR THE LANDFALL LOCATION BASED ON THE DATABASE WITH MAPPINGS

218 FACILITATING A PAYMENT FROM SELLERS OF CONTRACTS FOR THE AFFECTED ZIP CODES TO BUYERS OF THOSE CONTRACTS

FIG. 2

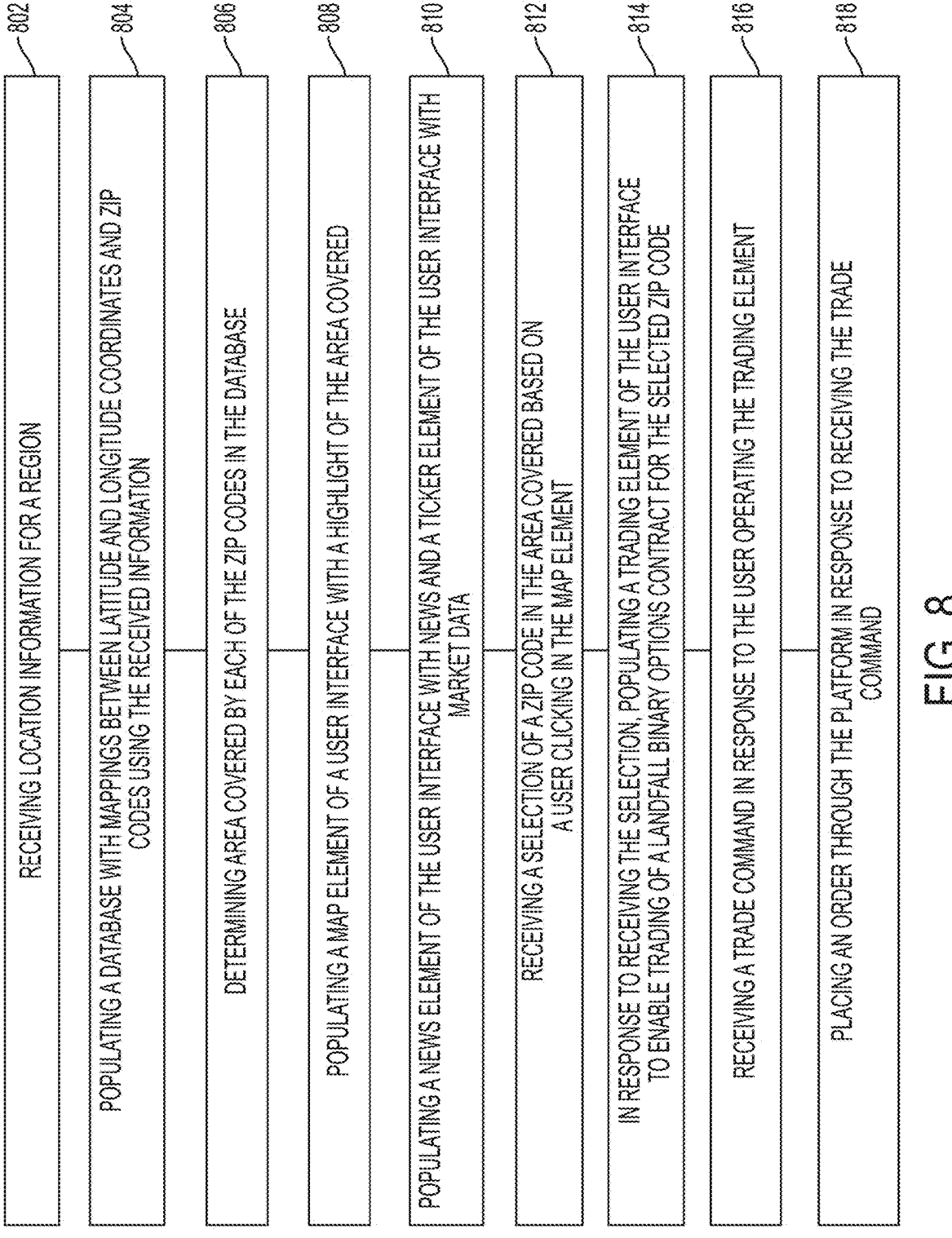

802 — RECEIVING LOCATION INFORMATION FOR A REGION

804 — POPULATING A DATABASE WITH MAPPINGS BETWEEN LATITUDE AND LONGITUDE COORDINATES AND ZIP CODES USING THE RECEIVED INFORMATION

806 — DETERMINING AREA COVERED BY EACH OF THE ZIP CODES IN THE DATABASE

808 — POPULATING A MAP ELEMENT OF A USER INTERFACE WITH A HIGHLIGHT OF THE AREA COVERED

810 — POPULATING A NEWS ELEMENT OF THE USER INTERFACE WITH NEWS AND A TICKER ELEMENT OF THE USER INTERFACE WITH MARKET DATA

812 — RECEIVING A SELECTION OF A ZIP CODE IN THE AREA COVERED BASED ON A USER CLICKING IN THE MAP ELEMENT

814 — IN RESPONSE TO RECEIVING THE SELECTION, POPULATING A TRADING ELEMENT OF THE USER INTERFACE TO ENABLE TRADING OF A LANDFALL BINARY OPTIONS CONTRACT FOR THE SELECTED ZIP CODE

816 — RECEIVING A TRADE COMMAND IN RESPONSE TO THE USER OPERATING THE TRADING ELEMENT

818 — PLACING AN ORDER THROUGH THE PLATFORM IN RESPONSE TO RECEIVING THE TRADE COMMAND

FIG. 8

INTERFACE FOR LANDFALL LOCATION OPTIONS

CROSS REFERENCE TO RELATED APPLICATIONS

This application is a continuation of U.S. patent application Ser. No. 18/368,608 filed Sep. 15, 2023, which is a continuation of U.S. patent application Ser. No. 17/515,643 filed Nov. 1, 2021 (now U.S. Pat. No. 11,798,084 issued Oct. 24, 2023), which is a continuation of U.S. patent application Ser. No. 15/616,575 filed Jun. 17, 2017 (now U.S. Pat. No. 11,164,249 issued Nov. 2, 2021), which claims the benefit of U.S. Provisional Patent Application No. 62/347,749 filed Jun. 9, 2016, each of which is incorporated by reference herein in its entirety.

FIELD

The present disclosure relates to weather prediction and, more specifically, to binary options based on weather prediction.

BACKGROUND

Weather forecasts may be based on quantitative data related to the atmosphere and the current state thereof. Forecast models may be employed to predict the approach of a storm and the storm's landfall location. Weather forecasting allows individuals and entities to prepare for possible property damage by a developing storm.

BRIEF DESCRIPTION OF THE FIGURES

FIG. 2 shows an example method in accordance with aspects of the present disclosure.

FIG. 8 shows an example method in accordance with aspects of the present disclosure.

SUMMARY

Figure 1:
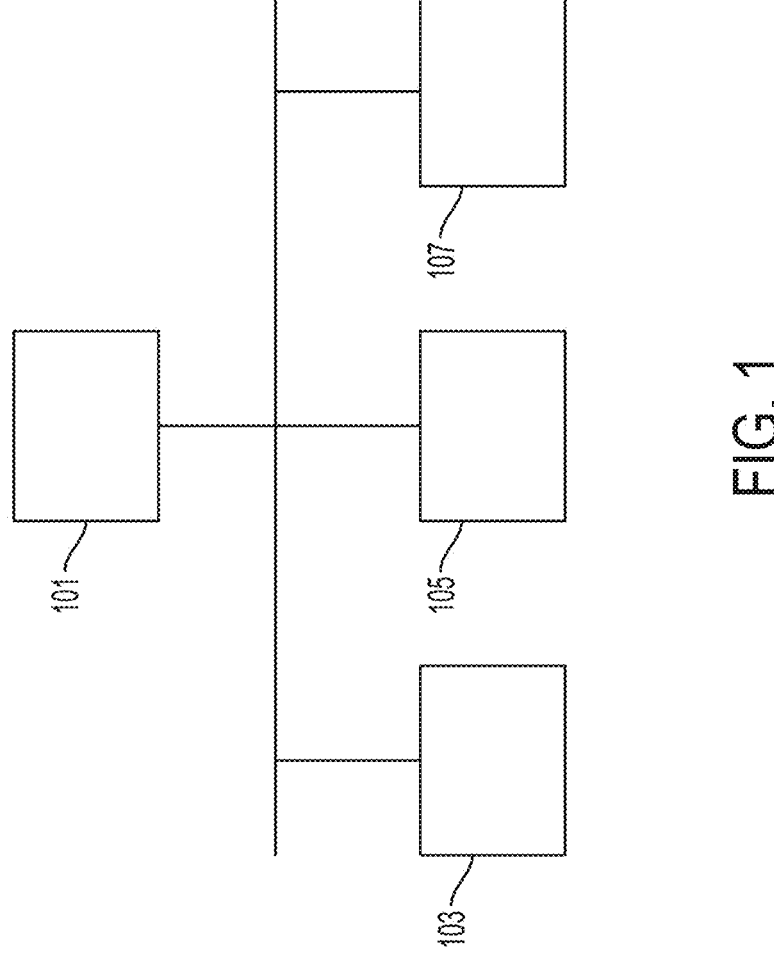
FIG. 1 shows an example system in accordance with aspects of the present disclosure.

As noted above, weather forecasts may be based on quantitative data related to the atmosphere. Weather derivatives are financial instruments that may be used to manage risks associated with adverse or unexpected weather conditions. For example, an owner of beach property may use a weather derivative to hedge against property damage due to a hurricane. However, there is no efficient computerized system to match sellers of such derivatives with buyers. There is also no efficient computerized system to give buyers and sellers different ways to purchase or sell these derivatives. In view of the foregoing, disclosed herein are an apparatus and method for trading binary options based on storm landfall predictions. In one example, an apparatus may include a memory, a display device, and a network interface to communicate with at least one remote device. The apparatus may also include at least one processor to receive from a remote device a plurality of longitude and latitude coordinate pairs; generate, in the memory, an association between a given longitude and latitude pair and each zip code within a certain radius from the given longitude and latitude pair; render on the display device a graphical user interface comprising a map and a circle around the given longitude latitude pair on the map, a radius of the circle corresponding to the certain radius; render, on the display device, data representing a binary option based on whether a storm will make landfall within the certain radius; receive data indicative of a request to purchase the binary option; receive from a remote device a landfall location of the storm; and, identify whether the landfall location corresponds to a zip code associated with the given longitude latitude pair in the memory.

In another example, a method is provided. The method may include receiving, by at least one processor, from a remote device a plurality of longitude and latitude coordinate pairs; generating in a memory, by the at least one processor, an association between a given longitude and latitude pair and each zip code within a certain radius from the given longitude and latitude pair; rendering, by the at least one processor, a graphical user interface, on the display device, comprising a map and a circle around the given longitude latitude pair on the map, a radius of the circle corresponding to the certain radius; rendering, by the at least one processor, on a display device data representing a binary option based on whether a storm will make landfall within the certain radius; receiving, by the at least one processor, data indicative of a request to purchase the binary option; receiving, by the at least one processor, from a remote device a landfall location of the storm; and, identifying, by the at least one processor, whether the landfall location corresponds to a zip code associated with the given longitude latitude pair in the memory.

The aspects, features, and advantages of the present disclosure will be appreciated when considered with reference to the following description of examples and accompanying figures. The following description does not limit the application; rather, the scope of the disclosure is defined by the appended claims and equivalents.

DETAILED DESCRIPTION

Some examples provide a platform for trading binary options or other financial instruments based on storm landfall location. A binary option may pay a buyer of the option a contract amount if an event occurs. The buyer may buy the binary option from a seller for a contract price. In some examples, a binary option may be based on weather events. If a weather event occurs, the buyer may be paid the contract amount. If the weather event does not occur, the seller may keep the contract price. One example weather event includes hurricanes. A hurricane binary option may take several forms that may relate to number of hurricanes, strength of one or more hurricanes, landfall of hurricane, and so on. Some examples relate to landfall location of a hurricane. However, it should be understood that various examples may relate to other characteristics of hurricanes and/or other weather or non-weather events.

FIG. 1 presents a schematic diagram of an illustrative computer apparatus 101 for executing the techniques disclosed herein. Computer apparatus 101 may be, for example, a binary trading platform. Computer apparatus 101 may comprise a device capable of processing instructions and transmitting data to and from other computers, including a laptop, a full-sized personal computer, a high-end server, or a network computer lacking local storage capability. Computer apparatus 101 may include various components, such as a keyboard and mouse and/or various other types of input devices such as pen-inputs, joysticks, buttons, touch screens, etc., as well as a display device, which could include, for instance, a CRT, LCD, plasma screen monitor, TV, projector, etc. The computer apparatus 101 may also contain a processor (not shown), which may be, for example, an application specific integrated circuit ("ASIC"), one or more microprocessors, central processing units (CPUs), computing devices, microcontrollers, digital signal processors, graphics processing units (GPUs) or like devices or any combination thereof.

Computer apparatus 101 may also comprise a memory that may store instructions. These instructions may be retrieved and executed by the processor.

The memory may be a non-transitory computer-readable medium ("CRM"). Non-transitory CRM may comprise any one of many physical media such as, for example, electronic, magnetic, optical, electromagnetic, or semiconductor media. Other specific examples of non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 101 directly or indirectly. The non-transitory computer readable medium may also include any combination of one or more of the foregoing and/or other devices as well. While only one processor and one non-transitory CRM are shown in FIG. 1, computer apparatus 101 may actually comprise additional processors and memories that may or may not be stored within the same physical housing or location.

Computer apparatus 101 may also comprise a network interface (not shown) to communicate with other devices 103, 105, and 107 over a network. Such a network may be a local area network ("LAN"), wide area network ("WAN"), the Internet, etc. The network and intervening nodes may also use various protocols including virtual private networks, local Ethernet networks, private networks using communication protocols proprietary to one or more companies, cellular and wireless networks, HTTP, and various combinations of the foregoing. Although only a few computers are depicted herein, it should be appreciated that a network may include additional interconnected computers. It should further be appreciated that computer apparatus 101 may be an individual node in a network containing a larger number of computers. In the example of FIG. 1, computer apparatus or device 103 may be a trusted information source; computer apparatus or device 105 may be a platform used for buying a binary option; and computer apparatus or device 107 may be a platform used for selling a binary option.

The instructions residing in the memory of computer apparatus 101 may comprise any set of instructions to be executed directly (such as machine code) or indirectly (such as scripts) by the processor. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

The binary options trading platform may receive information from the trusted source (e.g., computer apparatus or device 103) to enable listing of binary options. For example, the trusted source may be a government database of location information. The binary options trading platform may compile the information into a database to create a latitude/longitude pair mapping of zip codes. In one example, the binary option may be arranged so that if a next hurricane to make landfall in a region (e.g., the US, the Atlantic coast of North America, the east coast of the US, etc.) makes landfall in an area, the binary option pays a contract amount to the buyer. A platform may enable trading, clearing, and/or settling of such binary options between buyers and sellers for one or more location.

To facilitate such options, computer apparatus 101 may compute a variety of area parameters using a locally stored or remote database. Such a database may comprise computer registers, a relational database with multiple tables arranged with fields and records, XML documents, or flat files. The stored data may comprise any information sufficient to identify the relevant information, such as numbers, descriptive text, proprietary codes, references to data stored in other areas of the same memory or different memories (including other network locations) or information that is used by a function to calculate the relevant data.

Below is one example of a database table with associations between example latitude/longitude locations and zip codes in the US. A landfall at a latitude/longitude pair may be considered to make landfall in the area defined by the corresponding zip codes.

| 23.8N 80.4W | 33051 |
| 23.8N 80.5W | 33001 33036 33050 33051 33052 |
| 23.8N 80.6W | 33001 33036 33050 33051 33052 |
| 23.9N 80.2W | 33001 33036 |

A database that stores associations between each possible landfall location (e.g., by latitude/longitude pair) in a region to an area (e.g., by zip code) may be calculated by computer apparatus 101. In this example, the landfall latitude/longitude pair is mapped to a set of zip codes that have their latitude/longitude centroid in a 75 mile distance from the landfall latitude/longitude pair.

Data identifying zip code centroids is available from the US federal government base. Data identifying locations along the coast are also available from the US federal government database. To calculate the database of landfall locations to affected area defined by zip code set, the two databases may be accessed, and the information may be processed into a database similar to the table above.

A database of mappings from latitude/longitude to zip code may use a latitude/longitude pair that is at a different level of specificity than that given by the US government coastal database. For example, the federal government may provide locations along a coast every 500 meters while a mapping may provide latitude/longitude pairs at a tenth of a degree. An algorithm that combines multiple locations from the governmental database into single latitude/longitude pairs for the mapping may be performed on the government database data. For example, location information may be rounded, averaged, truncated, and so on from the government database to create the mappings database. In one example, each location in the government database may be rounded to a tenths place of latitude/longitude. Then a row may be created in the mappings database for each unique entry in the rounded government database data. This determination may be done for each location in the government database in a region so that the mappings database has an entry for each latitude/longitude pair in the region.

For each row of the mappings database, a latitude/longitude pair may be created. For each pair, a set of zip codes that have their centroids within 75 miles of the latitude/longitude pair may be determined. A government database that lists zip codes with their centroid locations may be accessed. The latitude/longitude for each row may be compared to each centroid in the government database to determine a distance. If the distance is within 75 miles (less than, less than or equal to) then an entry of that zip code may be made in the row. After this is completed, the mappings database may have a mapping between each latitude/longitude pair and the zip codes that have centroids within 75 miles of the latitude/longitude pair. The above table illustrates a small portion of the finished product of such a complex calculation.

This mappings database may enable hurricane landfall options to be listed by zip code. A business owner may desire to purchase a binary option to safeguard against loss in the zip code in which he or she operates. Through the platform, the business owner may purchase a hurricane landfall binary option for that specific zip code.

When a landfall occurs, the national weather service or some other trusted entity may report the location of the landfall in a latitude/longitude pair. The platform may look up the pair, say 23.8N 80.5 W to determine the affected zip codes. In this case, those zip codes are 33001, 33036, 33050, 33051, and 33052 from the table above. Binary options contracts for those zip codes will pay the buyers the respective contract amounts. Binary options for other zip codes will not pay the buyers anything.

The database arrangement above is one example of how the techniques disclosed herein improve the functioning of the computer. This database arrangement allows contracts to settle rapidly in response to receipt of landfall location information without additional complex and lengthy calculations of affected areas. However, it is understood that other examples may include other arrangements, other databases, other levels of specificity, and so on.

A buyer, via a computer apparatus or device 105, may submit a purchase order to buy a particular binary option for a specified zip code. A seller, via computer apparatus or device 107, may submit a sell order to sell the same binary option. The binary options trading platform may match the two orders. The trading platform may facilitate clearing and/or settling of the matched orders.

Buyers and seller may submit orders for contracts for any desired zip codes at any desired quantity and/or price. Matching prices may be determined by the platform to facilitate trading. Upon a match, a buyer's account maintained by the platform may be charged a quantity of contracts to be traded times contract price amount. The seller may receive that amount as credit in his account. Some examples may charge a commission to one or the other side or both. Any number of trades, settlements of contracts, and any number of users may be processed through the platform.

Some examples may require a margin amount to be kept by the seller so that if the seller must make a payment in the future for a sold contract, the amount for the payment is available. A seller may be prevented from lowering an account below a require margin amount. More information regarding margin is discussed further below.

FIG. 2 illustrates an example method that may be performed in some examples. Some examples may include receiving location information for a region (e.g., coastal location and/or zip code centroids), as shown in block 202. In block 204, some examples may include populating a database with mappings between latitude/longitude coordinates and zip codes using the received information. Some examples may include listing for trading hurricane landfall binary options for each mapped zip code, as depicted in block 206. In block 208, some examples may include providing information to trading interfaces to facilitate trading by buyers and/or sellers. In block 210, some examples may include matching orders for sale and purchase of the listed hurricane landfall binary options. Some example may include maintaining margin limits on sellers of options, as shown in block 212. In block 214, some examples may include receiving a latitude/longitude of a hurricane landfall. In block 216, some examples may include determining affected zip codes for the landfall location based on the database with mappings. Furthermore, some examples may include facilitating a payment from sellers of contracts for the affected zip codes to buyers of those contracts, as shown in block 218.

FIGS. 3-7 illustrate examples of interfaces that may be used in some examples. Such interfaces may be used to enable trading of hurricane landfall binary options through a platform. Such interfaces may include, but are not limited to, web pages, desktop applications, or mobile apps.

Figure 3:
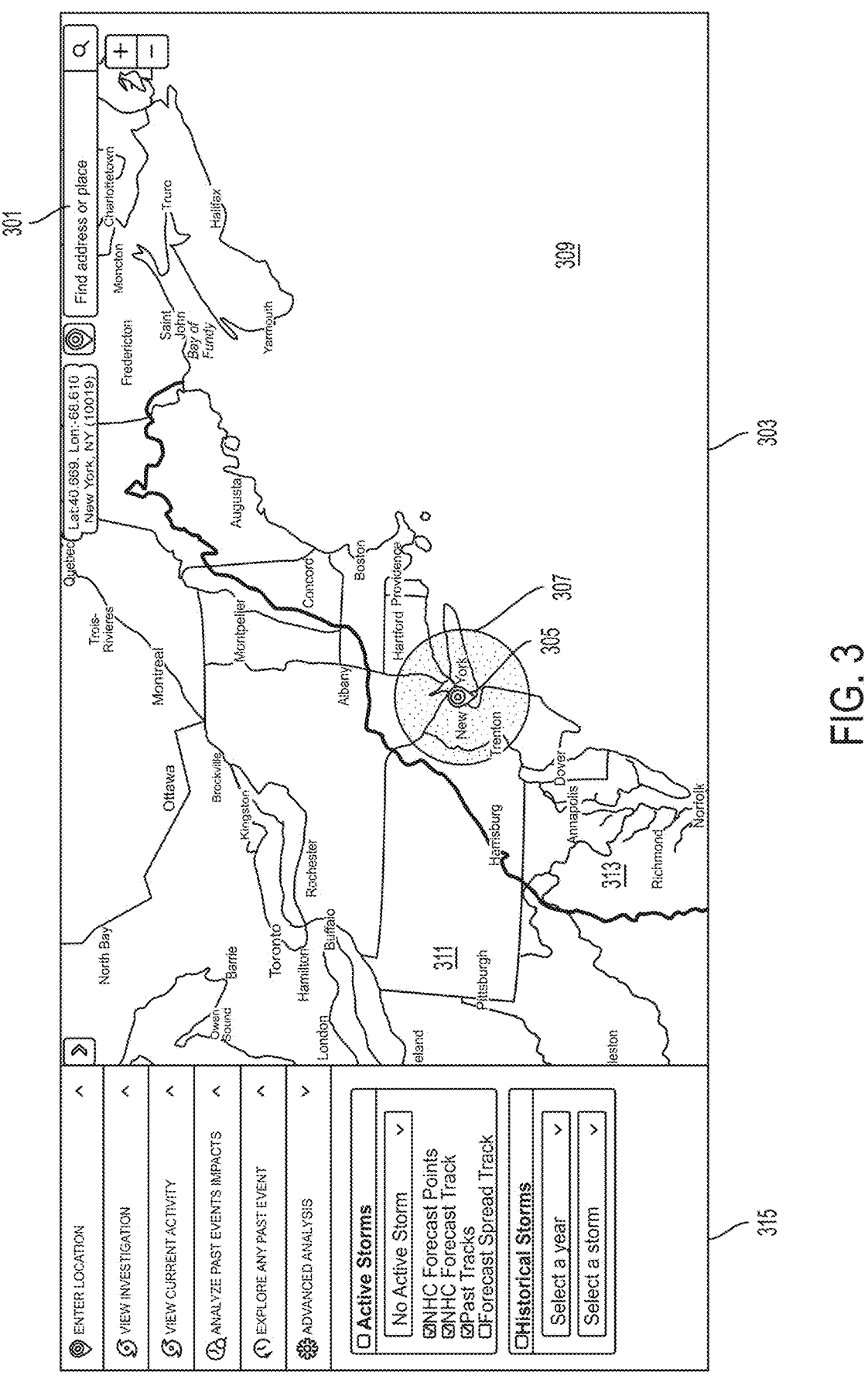
FIG. 3 shows an example interface in accordance with aspects of the present disclosure.

FIG. 3 shows an analysis interface that may be part of some examples. As shown, a user may enter a location into a location bar 301. In this example, the location that was entered includes New York zip code 10019. In response to entry of the zip code, the interface may adjust the map display 303. The map display may show an indicator 305 on a centroid of the entered zip code. The interface may show an area around the centroid where landfall may count as affecting the zip code. In the example, a circle 307 shown around the centroid showing a 75 mile area around the centroid is used. A binary options contract for the entered zip code would pay a buyer if landfall were made in that circle. The shown area may vary from example to example. The example of a circle and 75 miles is used as an example because that area is thought to be the most affected by a hurricane landfall. Some examples may have multiple areas that are based on hurricane category so that as the hurricane increases in intensity the area increases.

The map display 303 may have several shading levels. For example, the water area 309 may have a dark level of shading. In the example of FIG. 3, the land area 311 is not associated with any binary options listings. In this case, land area 311 may have a lightest shading level to indicate land with no binary options. A medium level of shading may be used to indicate land where binary options are listed. In the example of FIG. 3, land area 313 may be associated with binary options. The example of FIG. 3 includes zip codes, which have centroids within 75 miles of an identified coastal latitude/longitude pairing. As noted above, a complete listing of the zip codes may be determined from a mapping database created by the platform as discussed above. An outline of each zip code may be determined from a federal database of zip code locations. The medium shading area may be determined as the aggregate of the zip code outlines. Medium shading is given as an example only. Other forms of highlighting and/or indicating listing of contracts may be used.

In some examples a user may click on the map display 303 (e.g., in a location of the medium shading) to select a zip code. In response to the selection, a circle indicating the landfall area may be presented.

Other analysis tools, as indicated at 315, may be provided. For example, current activity (e.g., wind speed, pressure, other weather parameters of a location and/or hurricane, etc.), investigation tools, past event impact tools, active and historical storm tools, zoom tools, and so on may be provided.

Figure 4:
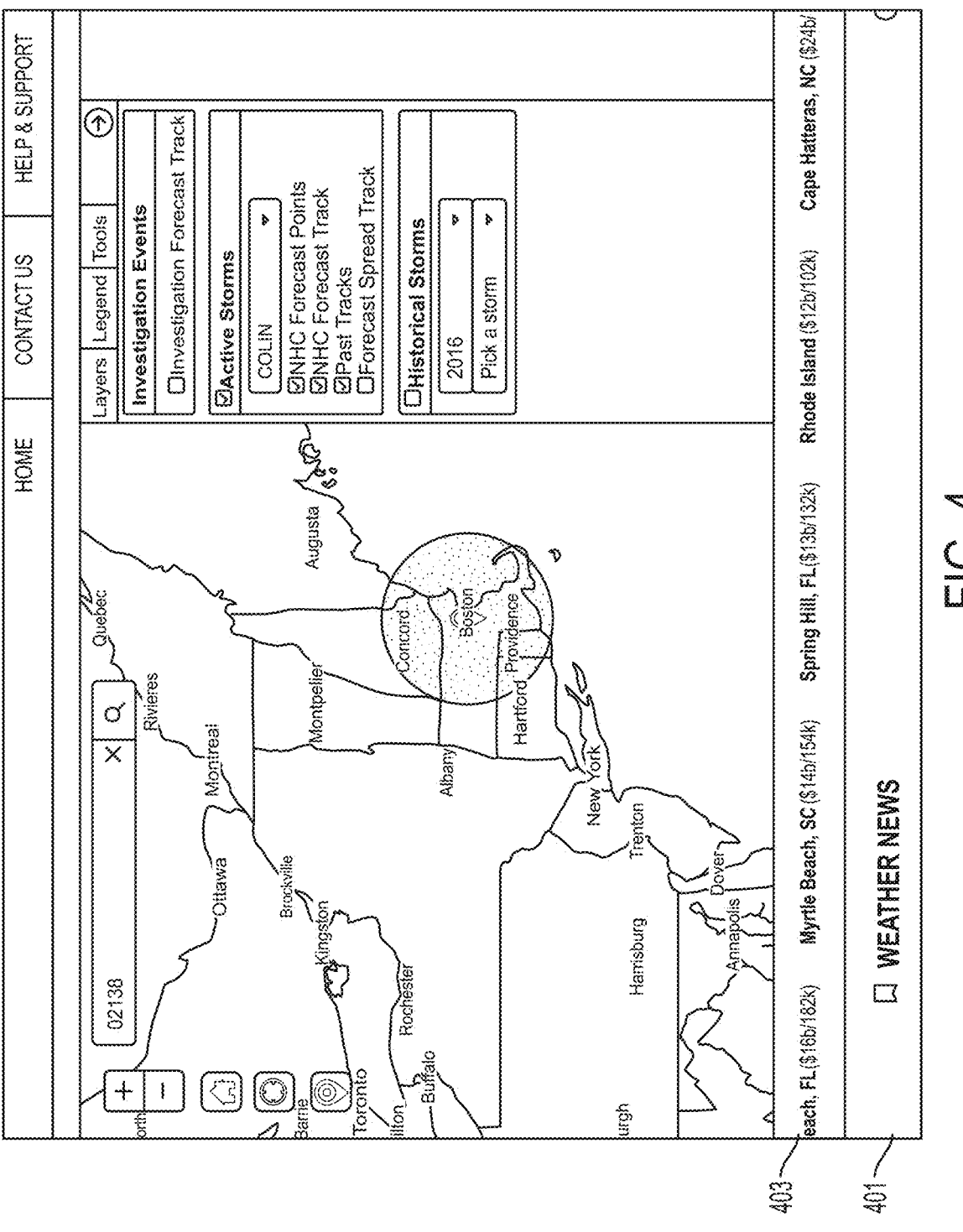
FIG. 4 shows an example interface in accordance with aspects of the present disclosure.

FIG. 4 shows another example interface. The interface of FIG. 4 is similar to that of FIG. 3 in that it can be used as an analysis interface. It may also be used as a trading interface similar to that of FIGS. 5 and 6 if a trading element is added to the interface. FIG. 4 includes a news element 401 and ticker element 403. A new element may provide weather and/or hurricane related news in general and/or specifically related to a selected area. Ticker element may provide pricing and/or trade information about binary options in general and/or specifically related to a selected area.

Figure 5:
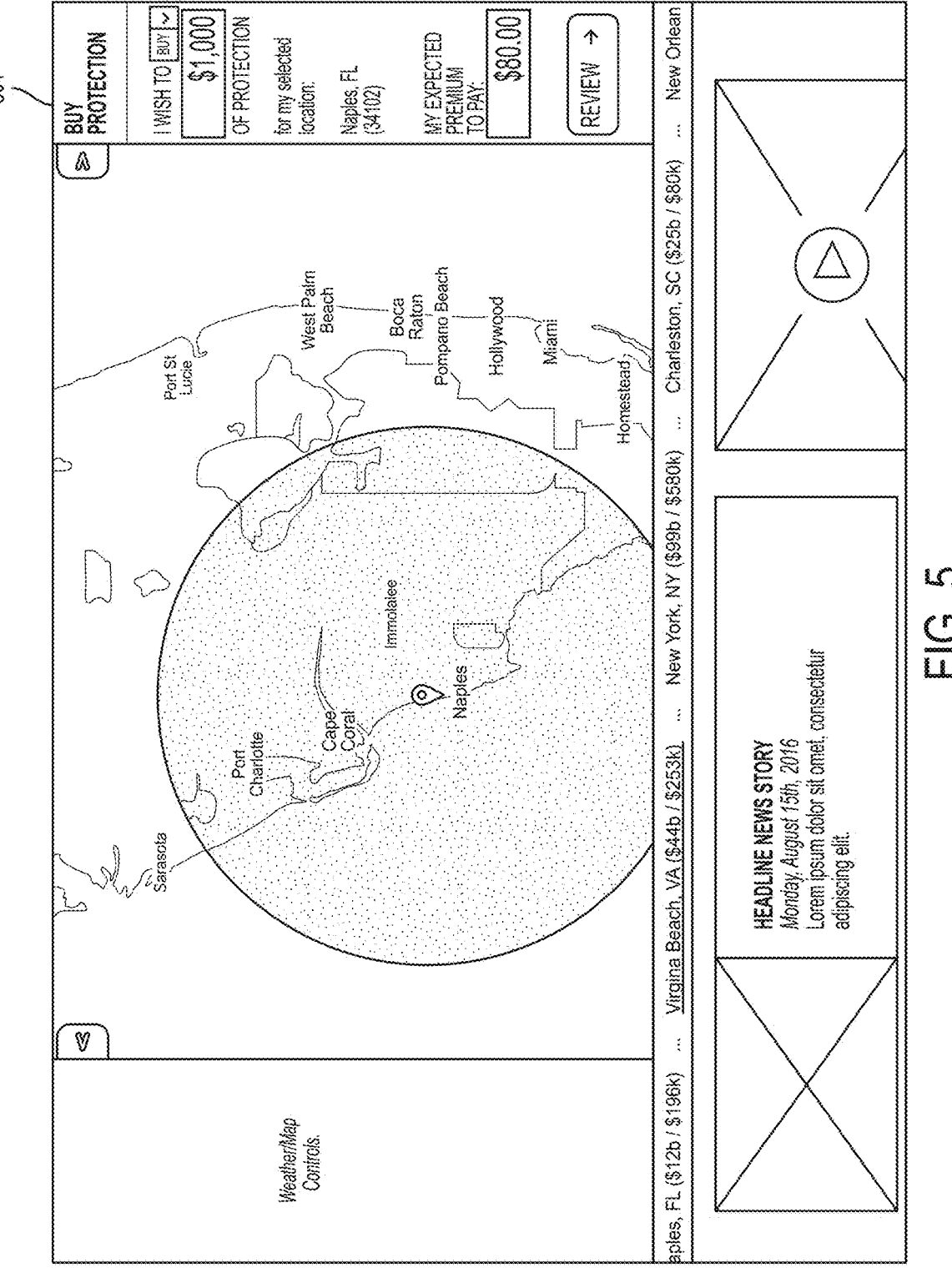
FIG. 5 shows an example interface in accordance with aspects of the present disclosure.
Figure 6:
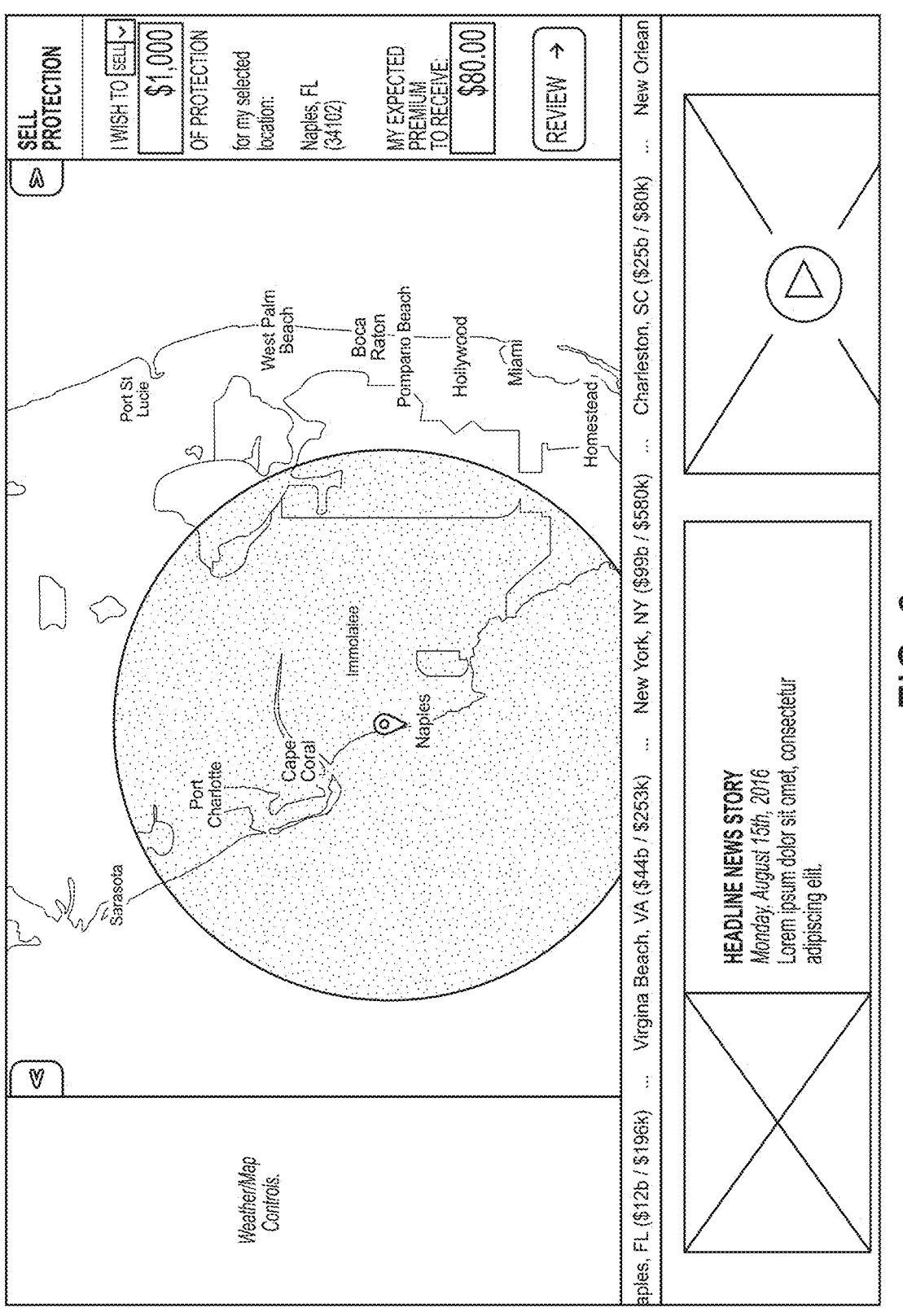
FIG. 6 shows an example interface in accordance with aspects of the present disclosure.

FIG. 5 illustrates another example interface that may be used in some examples. The interface of FIG. 5 is shown with the map display at a higher zoom level than the examples of FIG. 3 or 4. This example includes news and ticker areas. This example does not include analysis tools. This example includes a trading interface 501. In response to a user entering and/or clicking on a zip code, the trading interface may be shown and populated for buying and/or selling options related to the zip code. Without leaving the interface, a user may buy and/or sell binary options for a selected zip code. This example trading interface is in a buy configuration to buy $1000 of contract value at the 34102 zip code. The buyer will pay 80 dollars for this level of contract value. The buyer may select the review button to view a confirmation interface. Next, the user may click a submit button to submit an order. Other examples may not include such a review step but may submit directly without confirmation. In some examples, the buyer may change a quantity to submit an order for more or less contract value. In some examples, the user may change a price to submit a buy order at a higher or lower price. In some examples a price may be set at a current market price if sell orders are pending. FIG. 6 shows an interface similar to that of FIG. 5. The example of FIG. 6 shows the trading interface in a sell configuration rather than a buy configuration.

Figure 7:
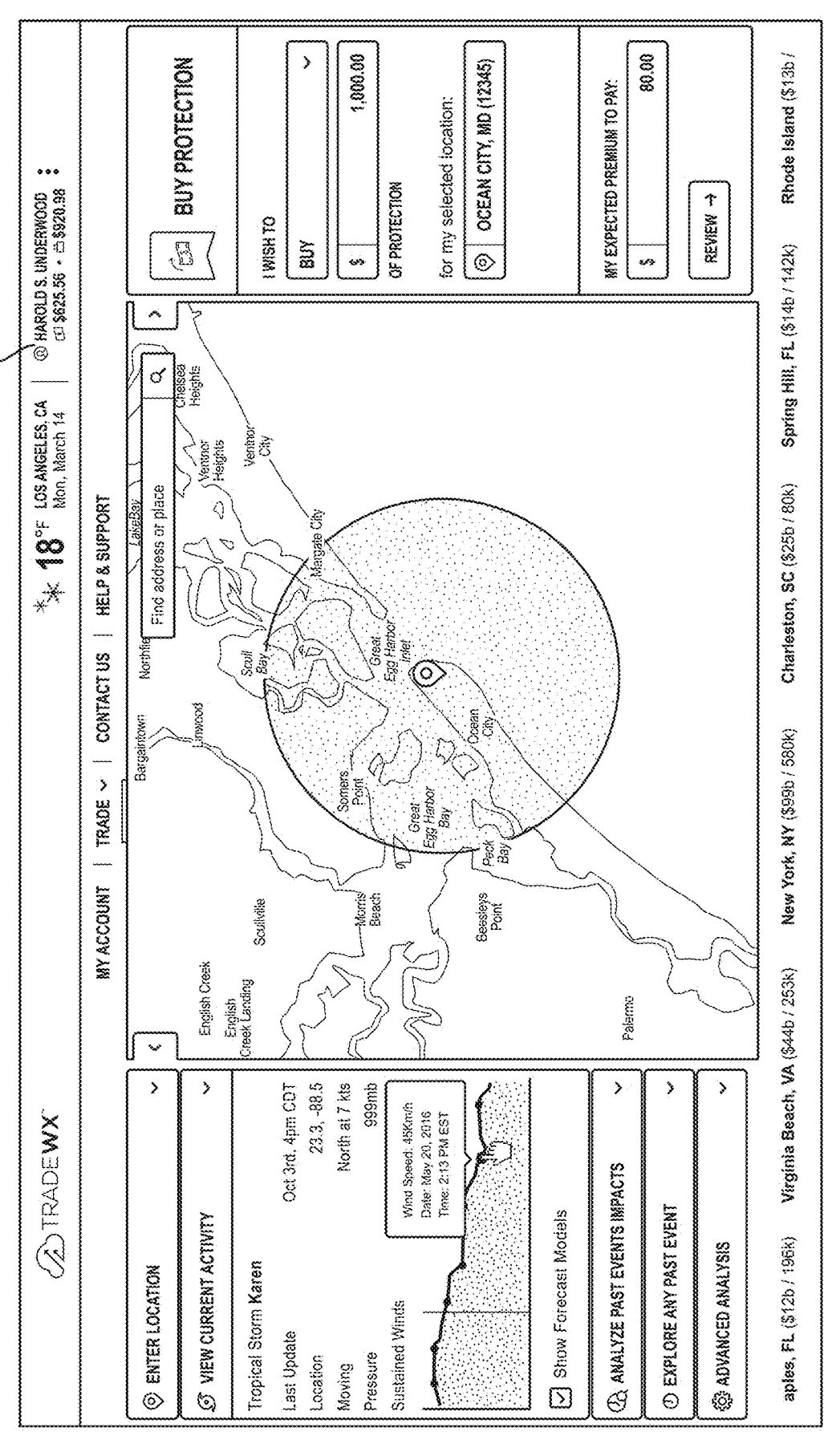
FIG. 7 shows an example interface in accordance with aspects of the present disclosure.

FIG. 7 shows yet another example interface that may be used. The example includes several elements such as a ticker element, a map display, an area indicator, a centroid marker, analysis tools, and a trading interface. The example also includes an account balance indicator showing an amount of money in a user account at 701. It should be recognized that a variety of combination of interface elements may be used in various examples to enable easy trading and/or analysis related to landfall binary options.

FIG. 8 illustrates an example method. In block 802, some examples may include receiving location information for a region. Some examples may include populating a database with mappings between latitude/longitude coordinates and zip codes using the received information, as shown in block 804. In block 806, some examples may include determining area covered by each of the zip codes in the database. Some examples may include populating a map element of a user interface with a highlight of the area covered, as shown in block 808. In block 810, some examples may include populating a news element of the user interface with news and a ticker element of the user interface with market data. In block 812, some examples may include receiving a selection of a zip code in the area covered based on a user clicking in the map element. Some examples may include in response to receiving the selection, populating a trading element of the user interface to enable trading of a landfall binary options contract for the selected zip code, as shown in block 814. In block 816, some examples may include receiving a trade command in response to the user operating the trading element. Some examples may include placing an order through the platform in response to receiving the trade command, as shown in block 818.

In some examples, a binary option may be based on a next hurricane to make landfall in a region. The contracts may not be specific to a particular hurricane but rather may trigger when any next hurricane makes landfall affecting a region. A hurricane that makes no landfall at all may not trigger a contract. In such a way, the contracts may be arranged so that there is no chance that they will not settle as long as hurricanes continue to make landfalls.

A contract may be arranged for subsequent hurricanes (e.g., the second or third hurricanes to make landfall). Multiple such subsequent hurricane contracts may be listed in some examples along with a next landfall contract. In some examples, subsequent listing may become active after a landfall occurs so that only next landfall contracts are listed at a time.

Other arrangements may include contracts that are limited by time and/or limited to a specific hurricane. Such arrangements may include situations where no landfall occurs. In such a scenario, a contract price may be returned to a buyer or kept by a seller depending on the arrangement of the platform.

Some examples may include requiring a seller to maintain a margin balance in an account. Such a requirement may be enforced by preventing withdrawals and/or purchases that would drop the account below the margin balance. Such a requirement may be enforced by preventing sales that would increase the margin requirement above an account balance.

A margin requirement may be determined based on a potential payment that a seller may be required to make based on all binary options contracts sold by the sell that have not yet settled. For example, if a seller may be liable for $1000 in payments to buyers then the seller's margin requirement may be $1000. This may ensure that the sell is able to pay obligations if they come due. After settlement of the contracts (e.g., the next landfall), the margin restriction on any unpaid out money may be released until/unless further sales are made.

Calculating a potential payment may take into account that zip code contracts may be mutually exclusive from one another. For example, a seller may sell a zip code in New York and a zip code in Florida related to a next landfall. Since one next hurricane cannot make a next landfall in both of those places, these contracts would be mutually exclusive. In some examples, the seller may not have a margin requirement of the sum of these potential obligations but rather the platform may calculate the margin requirement to be the higher of the two contracts.

In some examples, to make such a calculation, a platform may calculate a highest possible pay out required for any given latitude/longitude landfall location for the next landfall. For example, this can be done by summing contracts amounts that would be triggered by a landfall in each latitude/longitude location of a mapping database such as the one discussed above. The highest row may be calculated by being the assigned margin requirement for a seller.

Some examples where a seller is also a buyer may offset margin requirement calculations by amounts that the seller would receive on contracts the seller has purchased that would be triggered to give the seller money. For example, say a seller has sold and purchased one New York zip code in separate transactions. The margin requirement may be set at the amount possibly owed on the sold contracts minus the amount that would be received from the purchased contracts. Such an analysis may be performed as part of a latitude/longitude mutual exclusivity analysis described above that determines the location of landfall that would have a maximum payout when setting the margin requirement. Other examples may not include such offsetting.

In some examples, a single hurricane may make landfall twice. For example, it may hit land then move out to sea and then move back into land. In such a situation, a platform may consider only the first landfall of the hurricane. In such a situation, a platform may consider only the first landfall of the hurricane for a period of time (e.g., 12 hours). A platform may list contracts after the landfall that may be triggered by such subsequent landfalls. Contracts sold for a next landfall may be triggered by the first landfall and settled. Subsequent contracts may be triggered by the subsequent landfall and may be triggered. It that way only one landfall is relevant to a contract. Nevertheless, multiple contracts may be effected by a single hurricane that makes multiple landfalls. It should be recognized that while examples are given in terms of landfall hurricane contracts that other example might include other events. Other events may include for example, blizzards, rainstorms, tornados, earthquakes, mudslides, floods, monsoons, typhoons, fires, and so on.

It should be recognized that the examples are given as non-limiting only. Other examples may include different, additional, fewer, and so on arrangements. Elements form anyone embodies may be combined with other examples in any manner or combination.

Further Non-Limiting Example Information

A platform may enable trading in a binary option contract relating to the location of landfall of named tropical cyclones in the eastern half of the continental U.S. A tropical cyclone is a rotating, organized system of clouds and thunderstorms that originates over tropical or subtropical waters and has a closed low-level circulation. Tropical cyclones are classified by the more commonly used terms of tropical depression, tropical storm, hurricane, and major hurricane, and anytime such a tropical cyclone achieves sustained winds of at least 39 miles per hour then the National Hurricane Center will assign a name to that storm according to a pre-published list of names maintained by the World Meteorological Organization.

The Atlantic Named Storm Landfall Binary Option Contracts ("ANSL Contracts" or "Contract") may be characterized by the payment of an absolute amount to the holder of one side of the option and no payment to the counterparty. In this case, the long holder of the option is paid based upon landfall of a named storm in a designated area of the country. Each option may provide a number of designated landfall zones, identified by U.S. ZIP Codes, and termed a "Strike Code." There may be a no premiums or discounts relative to various locations; each location is a separate option contract. In general, the Contract is a binary option that will settle upon a Qualifying Atlantic Landfall and will pay $1.00 per contract to any long position holder within the Impacted Zip Code Area, and nothing to all other contract holders for that ANSL Contract.

Trading of the contract may be on a principles-only basis, and all participants are self-clearing. The risk position of all participants is fully margined in accordance with the Cantor Clearinghouse Order of Registration and its rules.

The ANSL Contract may be a cash settled contract based upon the objective determination of where a tropical cyclone makes landfall.

Although each Strike Code may be analogous to a specific "delivery point," deliverable supplies may not be a relevant consideration for this contract. Nor may the contract depend upon an index of pricing information to determine whether the binary option is in or out of the money. Rather, the contract may rely upon public advisories published by the National Hurricane Center, a division of the National Weather Service, a government agency. The nature of these advisories may be objective. The term of each contract may be until a named storm makes landfall or contract expiration, which will generally be November 30 of the calendar year in which it is listed, whichever is sooner.

The National Weather Service is an agency of the U.S. government produces advisories that the National Hurricane Center publishes based on objective information. No individual is able to manipulate or distort this information. Nor is any individual able to affect prices on the platform by manipulating these reports. Thus, the cash settlement determination is based upon publicly available, timely information that is reliable and widely accepted as an authoritative source for this information. Nevertheless, the platform may retain authority to use other sources of information for determining landfall in its discretion if the best interest of the market so requires. This authority may be used in the unforeseen event that National Hurricane Center advisories were unavailable. Such a secondary source may also be objective and verifiable. The platform may document any such decision.

The minimum price fluctuation may be one cent. Price bands may apply so that options may only be listed at values of more than one ($0.01) cent and less than ninety-nine ($0.99) cents.

The Contract may not have specified delivery months. Rather, a number of sequential contracts may be listed denoting the sequence of named storms that make qualified landfalls. Qualified landfalls are generally those, which occur within 75 statute miles of a U.S. ZIP Code's geographic center and are at least 12 hours after any other qualified landfall.

At least one ANSL Contract may be listed for trading every day prior to November 30 of each calendar year and may always correspond to the next occurring landfall. A number of additional contracts representing subsequent sequential landfalls may be listed simultaneously depending upon market demand. If landfall does not occur prior to an ANSL binary option's expiration, then that binary option may expire on the last trading day.

The platform has provided for a position accountability level of 10,000 contracts net long or short.

The ANSL Contracts may be subject to mandatory clearing on terms set by Cantor Clearinghouse.

Clearing of the ANSL Contract may be governed by the rules of the Cantor Clearinghouse, L.P. (the "Clearinghouse"). These Contract Rules may be established pursuant to and constitute "Contract Rules" under Rule IX-4 (e) of the Rules of the platform. The platform may be solely responsible for determining whether a Qualifying Atlantic Landfall ("QAL") occurred and its location relying primarily on Public Advisories published on the website www.nhc.noaa.gov and issued by NOAA's National Hurricane Center (NHC). The platform may make no warranties with respect to the accuracy of the NHC's advisory and in its discretion may use other public and private weather reporting sources to determine the location of a QAL when doing so is in the best interest of the marketplace. The platform shall document the information on which it declares a QAL.

In response to the NHC publishing that an Atlantic named storm has made landfall, the platform may designate such landfall as a QAL provided that the following criteria is met: (A) the storm was named prior to the time of landfall; (B) the latitude/longitude of such landfall is listed on the "Landfall" column of a mapping database; (C) the landfall is at least 12 hours after any previous QAL; (D) the landfall is not a revision or amendment to a prior landfall or inactive storm; and (E) the landfall occurs when there is an ANSL Contract listed for trading. Such requirements are non-limiting examples and other example may include more, different and/or fewer requirements.

QALs may be published on the platform website and may include storm name (if applicable), date, and time of landfall, latitude, and longitude of landfall.

Multiple landfalls by the same named storm may qualify as separate QALs; provided however, that each successive landfall more than 12 hours apart from the prior landfall of the same named storm will be for the next contract in the series. Certain landfall latitude/longitude points that qualify as QALs may lie in territories that are not part of the continental United States.

After a QAL has occurred, the platform may determine the Impacted ZIP Code Area by looking up the latitude/longitude of the QAL in a mapping database and identify the corresponding Impacted ZIP Code Area. Each open position that has a Strike Code within the Impacted ZIP Code Area may be Cash Settled at a value of one dollar; other Strike Codes may be settled at a value of zero dollars. If no QAL has occurred by the close of Trading on the Last Trading Day, then all Strike Codes for that contract may be settled at a value of zero dollars.

Settlement of open positions in each ANSL Contract may occur after each QAL by the end of the first Business Day following the QAL, or if no QAL has occurred, the Last Trading Day. If a QAL occurs prior to the Last Trading Day, a new Contract in the series may be listed.

Each ANSL Contract may be identified as WXANSLyyee where "yy" may correspond to the two-digit year and "ee" may be the ANSL Contract's sequential order. That is, the first ANSL Contract for the 2016 season may be listed as WXANSL1601, the second ANSL Contract for the season may be listed as WXANSL1602, etc. Individual contracts within such a series may be listed simultaneously or sequentially at the discretion of the platform.

The First Trading Day for the initial ANSL Contract in each calendar year may be listed on the first Monday of January of that calendar year.

The First Trading Day for each subsequent ANSL Contract in the series may be listed either (A) by notice as posted on the platform website or (B) on the next Business Day after an QAL occurred if the sequential contract has not already been listed. No new ANSL Contracts may be listed after November 30 of each calendar year.

The Termination of Trading for each ANSL Contract in the series may be: (A) upon a QAL that corresponds with the ANSL Contract; or (B) November 30 of that calendar year unless there is an active named Atlantic basin named storm on November 30, in which case the Last Trading Day may be the earlier of the last Business Day of the calendar year or the first date on which there is no active Atlantic basin named storm.

Except as otherwise posted on the platform website, regular trading of ANSL Contracts may be Sunday 6:30 PM ET through Friday 4:00 PM ET. In some examples, no trading in these contracts may occur between the hours of 4:00 PM ET and 6:30 PM ET on any Platform Trading Day.

The platform may provide for continuous trading, including Saturdays and Sundays, of ANSL Contracts whenever the following occur: (A) any named storm is forecast to make landfall on the continental United States between Friday 4:00 PM ET and Sunday 6:30 PM ET; or (B) a Category 1 or Category 2 Hurricane is within 1,000 miles of the United States coastline or is expected to make United States Landfall within the next 7 calendar days; or (C) a Category 3 or stronger named storm is present in the Atlantic basin. The platform may post on its website when it is open for continuous trading. Any trades that occur after 4:00 PM ET on regular trading days will be reported with trades of the following regular trading day. It should be recognized that such trading hours are given as examples only.

The valid Strike Codes for ANSL Contracts include those listed as part of an Impact ZIP Code Area in the mapping database. Revisions to the database may be posted as necessary on the platform website.

There may be no trading in ANSL Contracts at more than ninety-nine cents ($0.99) or less than one cent ($0.01). The minimum trading increment of each ANSL Contract may be one cent. The position accountability level may be 10,000 contracts net short or net long each ANSL Strike Code. Original Margin may be 100% of the at-risk amount for Participants of each ANSL Contract as required by the Clearinghouse.

The mapping database may correlate Atlantic Named Storm Landfall points with corresponding In-the-money Cantor Platform Strike Codes. The Final Settlement of the next sequential ANSL Contract may be determined by the platform looking up the latitude/longitude landfall and, if such landfall is a Qualifying Atlantic Landfall, then settling the corresponding Strike Codes listed in the mapping database at one dollar ($1.00) and settling all other Strike Codes for that contract at zero dollars ($0.00).

Cantor Platform Strike Codes generally correspond to the approximately 9500 U.S. Postal Service ZIP Codes whose geographic centroids lie within 75 statute miles of a latitude/longitude point that is proximal to the U.S. Atlantic Basic coastline, which includes the Atlantic Ocean, Caribbean Sea, and Gulf of Mexico.

In some examples, only latitudes and longitudes listed in the mapping database may be used to qualify as landfall events. Although they may be rare, named storms, having landfalls that are not listed in the database may be considered an "out-of-bounds" landfall and may not be a Qualifying Atlantic Landfall. Therefore, the next sequential ANSL Contract may continue trading as though no landfall occurred.

Certain landfall latitude/longitude points may lie in territories that are not part of the continental United States. For example, certain qualifying latitude/longitude points may be located with the territorial boundaries of the Dry Tortugas, the Bahamas, and Canada. The points may be included because their latitude/longitude are within 75 miles of the centroid of a U.S. ZIP Code and therefore may be considered impactful on those ZIP Codes.

Notwithstanding the U.S. Postal Service occasional addition, deletion, or redefinition of the zip code centroids, the relationships in the mapping database may be static for each calendar year. Further, no changes by the U.S. Postal Service made after January 1 of the year in which a contract is listed may affect the definition of which Strike Codes are settled in-the-money for each landfall during that calendar year.

Several ZIP Codes cover large areas and may not be contiguous. Therefore, when viewing these ZIP Codes on a mapping tool, these may appear to lie farther than 75 miles from an Atlantic Basin latitude or longitude landfall point. However, in such cases the platform may determine that the centroid of the ZIP Code lies within 75 miles of at least one such landfall point.

The following sections provide a guide to interpreting the present application.

I. Terms

The term "product" means a machine, manufacture, and/or composition of matter, unless expressly specified otherwise.

The term "process" means a process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget, but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates many things). (Indication can be used as a very broad term in claim language. For example: receiving an indication of a financial instrument.

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another example" in describing an example does not imply that the referenced example is mutually exclusive with another example (e.g., an example described before the referenced example), unless expressly specified otherwise. Similarly, the mere fact that two (or more) examples are referenced does not imply that those examples are mutually exclusive.

The terms "including," "comprising" and variations thereof mean "including but not necessarily limited to," unless expressly specified otherwise. Thus, for example, the sentence "the machine includes a red widget and a blue widget" means the machine includes the red widget and the blue widget but may possibly include one or more other items as well.

The term "consisting of" and variations thereof mean "including and also limited to," unless expressly specified otherwise. Thus, for example, the sentence "the machine consists of a red widget and a blue widget" means the machine includes the red widget and the blue widget but does not include anything else.

The term "compose", and variations thereof mean, "to make up the constituent parts of, component of, or member of," unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of," unless expressly specified otherwise. Thus, for example, the sentence "the red widget and the blue widget exclusively compose a machine" means the machine consists of the red widget and the blue widget (i.e., and nothing else).

The terms "a," "an" and "the" refer to "one or more," unless expressly specified otherwise. Thus, for example, the phrase "a widget" means one or more widgets, unless expressly specified otherwise. Similarly, after reciting the phrase "a widget," a subsequent recitation of the phrase "the widget" means "the one or more widgets." Accordingly, it should be understood that the word "the" might also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more," unless expressly specified otherwise.

The term "herein" means, "in the present application, including anything which may be incorporated by reference," unless expressly specified otherwise.

The phrase "at least one of," when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of," when such phrase modifies a plurality of things does not mean "one of each of" the plurality of things. For example, the phrase "at least one of a widget, a car, and a wheel" does not mean "one widget, one car, and one wheel."

Numerical terms such as "one ", "two ", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget," and therefore the phrase "one widget" does not cover, e.g., two widgets.

The phrase "based on" does not mean, "based only on," unless expressly specified otherwise. In other words, the phrase "based on" covers both "based only on" and "based at least on." The phrase "based at least on" is equivalent to the phrase "based at least in part on." For example, the phrase "element A is calculated based on element B and element C" covers examples where element A is calculated as the product of B times C (in other words, A=B×C); examples where A is calculated as the sum of B plus C (in other words, A=B+C); examples where A is calculated as a product of B times C times D; examples where A is calculated as a sum of the square root of B plus C plus D times E, and so on.

The term "represent" and like terms are not exclusive, unless expressly specified otherwise. For example, the term "represents" does not mean "represents only," unless expressly specified otherwise. For example, the phrase "the data represents a credit card number" covers both "the data represents only a credit card number" and "the data represents a credit card number, and the data also represents something else".

The term "whereby" is used herein only to precede a clause or other set of words that express only the intended result, objective, or consequence of something that is explicitly recited before the term "whereby." Thus, when the term "whereby" is used in a claim, the clause, or other words that the term "whereby" modifies do not establish specific further limitations of the claim or otherwise restrict the meaning or scope of the claim.

The terms "e.g.," "such as" and like terms mean "for example," and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "respective" and like terms mean "taken individually." Thus, if two or more things have "respective" characteristics, then each such thing has its own characteristic, and these characteristics can be different from each other but need not be. For example, the phrase "each of two machines has a respective function" means that the first of the two machines has a function, and the second of the two machines has a function as well. The function of the first machine may or may not be the same as the function of the second machine.

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4 . . . 9, 10) and non-integers (e.g., 1.0031415926, 1.1, 1.2 . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to," the mere usage of the phrase "including but not limited to" does not mean that the term "including" means something other than "including but not limited to."

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), rendering into electronic format or digital representation, ascertaining and the like. In addition, "determining" can include receiving (e.g., receiving information), accessing (e.g., accessing data in a memory) and the like. In addition, "determining" can include resolving, selecting, choosing, establishing, and the like.

The term "determining" does not imply certainty or absolute precision, and therefore "determining" can include estimating, extrapolating, predicting, guessing, averaging, and the like.

The term "determining" does not imply that mathematical processing must be performed and does not imply that numerical methods must be used and does not imply that an algorithm is used.

The term "determining" does not imply that any particular device must be used. For example, a computer need not necessarily perform the determining.

The term "determining" may include "calculating." The term "calculating" should be understood to include performing one or more calculations. Calculating may include computing, processing, and/or deriving. A computing device may perform calculating. For example, calculating a thing may include applying an algorithm to data by a computer processor and generating the thing as an output of the processor.

The term "determining" may include "referencing." The term "referencing" should be understood to include making one or more reference, e.g., to a thing. Referencing may include querying, accessing, selecting, choosing, reading, and/or looking-up. A computing device may perform the act of referencing. For example, referencing a thing may include reading a memory location in which the thing is stored by a processor.

The term "determining" may include "receiving." For example, receiving a thing may include taking in the thing. In some examples, receiving may include acts performed to take in a thing, such as operating a network interface through which the thing is taken in. In some examples, receiving may be performed without acts performed to take in the thing, such as in a direct memory write or a hard-wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and a second claim that depends on the first claim uses a definite article "the" to refer to that limitation (e.g., "the widget"), this mere usage does not imply that the first claim covers only one of the features. Furthermore, this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another example more than one device or article (whether or not they cooperate) may alternatively be used in place of the single device or article that is described. Accordingly, the functionality that is described as being possessed by a device may alternatively be possessed by more than one device or article (whether or not they cooperate) in another example.

Similarly, where more than one device, article or other product is described herein (whether or not they cooperate), in another example a single device or article may alternatively be used in place of the more than one device or article that is described. For example, a plurality of computer-based devices may be substituted with a single computer-based device. In some examples, such a plurality of computer-based devices may operate together to perform one step of a process such as is common in grid computing systems. In some examples, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

One or more other devices which are described but are not explicitly described as having such functionality or features may in another example, alternatively embody the functionality and/or the features of a single device that is described. Thus, other examples need not include the described device itself, but rather can include the one or more other devices, which would, in those other examples, have such functionality or features.

IV. Disclosed Examples and Terminology Are Not Limiting

Neither the Title (set forth at the beginning of the first page of the present application) nor the Abstract (set forth at the end of the present application) is to be taken as limiting in any way the scope of the disclosure, is to be used in interpreting the meaning of any claim or is to be used in limiting the scope of any claim. An Abstract has been included in this application merely because an Abstract is required under 37 C.F.R. § 1.72 (b).

The headings of sections provided in the present application are for convenience only and are not to be taken as limiting the disclosure in any way.

Numerous examples are described in the present application and are presented for illustrative purposes only. The described examples are not, and are not intended to be, limiting in any sense. The disclosure is widely applicable to numerous examples, as is readily apparent from the disclosure. One of ordinary skill in the art will recognize that the technology disclosed herein may be practiced with various modifications and alterations, such as structural, logical, software, and electrical modifications. Although particular features of the disclosure may be described with reference to one or more particular examples and/or drawings, it should be understood that such features are not limited to usage in the one or more particular examples or drawings with reference to which they are described, unless expressly specified otherwise.

Though an example may be disclosed as including several features, other examples may include fewer than all such features. Thus, for example, a claim may be directed to less than the entire set of features in a disclosed example, and such claim would not be interpreted as requiring features beyond those features that the claim expressly recites.

All disclosed examples are not necessarily covered by the claims (even including pending, amended, issued, and canceled claims). In addition, a disclosed example may be (but need not necessarily be) covered by several claims. Accordingly, where a claim (regardless of whether pending, amended, issued, or canceled) is directed to a particular example, such is not evidence that the scope of other claims do not also cover that example.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an example with several components or features does not imply that all or even any of such components or features is required. On the contrary, a variety of optional components is described to illustrate the wide variety of possible examples. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary and does not imply that the illustrated process is preferred.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category. An enumerated list of items (which may or may not be numbered) does not imply that any or all of the items are equivalent to each other or readily substituted for each other.

VII. Disclaimer

Numerous references to a particular example do not indicate a disclaimer or disavowal of additional, different examples, and similarly references to the description of examples, which all include a particular feature, do not indicate a disclaimer or disavowal of examples, which do not include that particular feature. A clear disclaimer or disavowal in the present application will be prefaced by the phrase "does not include" or by the phrase "cannot perform."

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. An apparatus comprising a memory; a display device; a network interface to communicate with at least one remote device; at least one processor to: receive from a remote device a plurality of longitude and latitude coordinate pairs; generate in the memory an association between a given longitude and latitude pair and each zip code within a certain radius from the given longitude and latitude pair; render on the display device a graphical user interface comprising a map and a circle around the given longitude latitude pair on the map, a radius of the circle corresponding to the certain radius;

render, on the display device, data representing a binary option based on whether a storm will make landfall within the certain radius; receive data indicative of a request to purchase the binary option; receive from a remote device a landfall location of the storm; identify whether the landfall location corresponds to a zip code associated with the given longitude latitude pair in the memory; upon identifying that the landfall location corresponds to a zip code associated with the given longitude latitude pair in the memory, render data presenting a subsequent binary option, on the display device, in response to the storm returning to the same landfall location within a predetermined time period.

2. The apparatus of claim 1, herein the at least one processor is further configured to, in response to identifying that the landfall location corresponds to the zip code, calculate a payout of the binary option at least partially based on a strength of the storm.

3. The apparatus of claim 1, wherein the at least one processor is further configured to: render the circle on the display device with a first shade, before the at least one processor receives data indicative of a sale of the binary option.

4. The apparatus of claim 3, wherein the at least one processor is further configured to: alter the circle rendered on the display device to a second shade different from the first shade, in response to receipt of the data indicative of the sale of the binary option.

5. The apparatus of claim 1, wherein the at least one processor is further configured to alter a specificity of the plurality of longitude and latitude pairs.

6. The apparatus of claim 5, wherein, to alter the specificity, the at least one processor is further configured to round each of the plurality of longitude and latitude pairs.

7. The apparatus of claim 1, wherein the at least one processor is further configured to: detect, via the graphical user interface, input of a zip code within the certain radius from the given longitude and latitude pair; and render the circle around the given longitude and latitude pair on the map, in response to detection of the zip code being input via the graphical user interface.

8. The apparatus of claim 1, wherein the at least one processor is further configured to render weather related news corresponding to an area within the circle on the map.

9. The apparatus of claim 1, wherein the at least one processor is further configured to render data presenting the subsequent binary option, on the display device, after settling the binary option.

10. A method comprising: receiving, by at least one processor, from a remote device a plurality of longitude and latitude coordinate pairs; generating in a memory, by the at least one processor, an association between a given longitude and latitude pair and each zip code within a certain radius of the given longitude and latitude pair; rendering, by the at least one processor, a graphical user interface, on a display device, comprising a map and a circle around the given longitude and latitude pair on the map, a radius of the circle corresponding to the certain radius; rendering, by the at least one processor, on a display device data representing a binary option based on whether a storm will make landfall at at least one location corresponding to one of the plurality of longitude and latitude coordinate pairs; receiving, by the at least one processor, data indicative of a request to purchase the binary option; receiving, by the at least one processor, from the remote device a landfall location of the storm; identifying, by the at least one processor, whether the landfall location corresponds to a zip code associated with the given longitude and latitude pair in the memory; and if so, upon identifying that the landfall location corresponds to a zip code associated with the given longitude latitude pair in the memory, rendering, by the at least one processor, data presenting a subsequent binary option, on the display device, in response to the storm returning to the same landfall location within a predetermined time period.

11. The method of claim 10, further comprising: rendering, by the at least one processor, the circle on the display device with a first shade, before the at least one processor receives data indicative of a sale of the binary option.

12. The method of claim 11, further comprising: altering, by the at least one processor, the circle rendered on the display device to a second shade different from the first shade, in response to receipt of the data indicative of the sale of the binary option.

13. The method of claim 10, further comprising altering, by the at least one processor, a specificity of the plurality of longitude and latitude pairs.

14. The method of claim 13, wherein altering the specificity further comprises rounding, by the at least one processor, each of the plurality of longitude and latitude pairs.

15. The method of claim 10, further comprising: detecting, by the at least one processor, inputvia the graphical user interface of a zip code within the certain radius from the given longitude andlatitude pair; and rendering, by the at least one processor, the circle around the given longitude and latitude pair on the map, in response to detecting the zip code being input via the graphical user interface.

16. The method of claim 10, further comprising rendering, by the at least one processor, weather related news corresponding to an area within the circle on the map.

17. The method of claim 10, wherein the at least one processor is further comprising rendering, by the at least one processor, data representing the subsequent binary option, on the display device, after settling the binary option.

18. A non-transitory computer readable medium with instructions stored therein which upon execution instruct at least one processor to:

receive from a remote device a plurality of longitude and latitude coordinate pairs;

generate in a memory an association between a given longitude and latitude pair and each zip code within a certain radius of the given longitude and latitude pair;

render on a display device a graphical user interface comprising a map and a circle around the given longitude and latitude pair on the map, a radius of the circle corresponding to the certain radius; render, on the display device, data representing a binary option based on whether a storm will make landfall at at least one location corresponding to one of the plurality of longitude and latitude coordinate pairs;

receive data indicative of a request to purchase the binary option; receive from the remote device a landfall location of the storm; identify whether the landfall location corresponds to a zip code associated with the given longitude and latitude pair in the memory; and, upon identifying that the landfall location corresponds to a zip code associated with the given longitude latitude pair in the memory, render, by the at least one processor, data presenting a subsequent binary option, on the display device, in response to the storm returning to the same landfall location within a predetermined time period.

* * * * *